United States Patent [19]

Gordon

[11] Patent Number: 4,574,942
[45] Date of Patent: Mar. 11, 1986

[54] PIPE TRANSPORTING MACHINE

[76] Inventor: John H. Gordon, 855 Brandywine Rd., Downingtown, Pa. 19335

[21] Appl. No.: 560,319

[22] Filed: Dec. 12, 1983

[51] Int. Cl.⁴ .............................................. B65G 25/00
[52] U.S. Cl. ................................. 198/773; 198/463.5; 414/748
[58] Field of Search ........................ 198/773; 414/748; 198/774, 621, 474, 410, 862, 860, 817

[56] References Cited

U.S. PATENT DOCUMENTS

| | | | |
|---|---|---|---|
| 3,355,008 | 11/1967 | Milazzo | 198/774 X |
| 3,720,051 | 3/1973 | Quick | 198/773 X |
| 4,024,946 | 5/1977 | Muller et al. | 198/774 X |
| 4,388,039 | 6/1983 | Schwarze | 414/748 |
| 4,431,037 | 2/1984 | Schevey et al. | 198/862 X |

Primary Examiner—Joseph E. Valenza
Assistant Examiner—Jonathan D. Holmes
Attorney, Agent, or Firm—Steele, Gould & Fried

[57] ABSTRACT

A pipe transporting machine is provided to move discrete lengths of pipe across the machine in incremental steps. A spaced pair of first and second indexing members are simultaneously reciprocal between a lower position and an upper position to alternately transversely move and then stop each length of pipe. Pluralities of kicker assemblies are spaced along each of the first and second indexing members to alternately traverse and stop each length of pipe upon each vertical reciprocation of the indexing members. First and second lock bars are simultaneously engageable with and disengageable from the kicker assemblies to permit simultaneous and uniform height adjustment of the pluralities of kicker assemblies. In the preferred embodiment, the first indexing member is longitudinally movable relative to the second indexing member.

15 Claims, 8 Drawing Figures

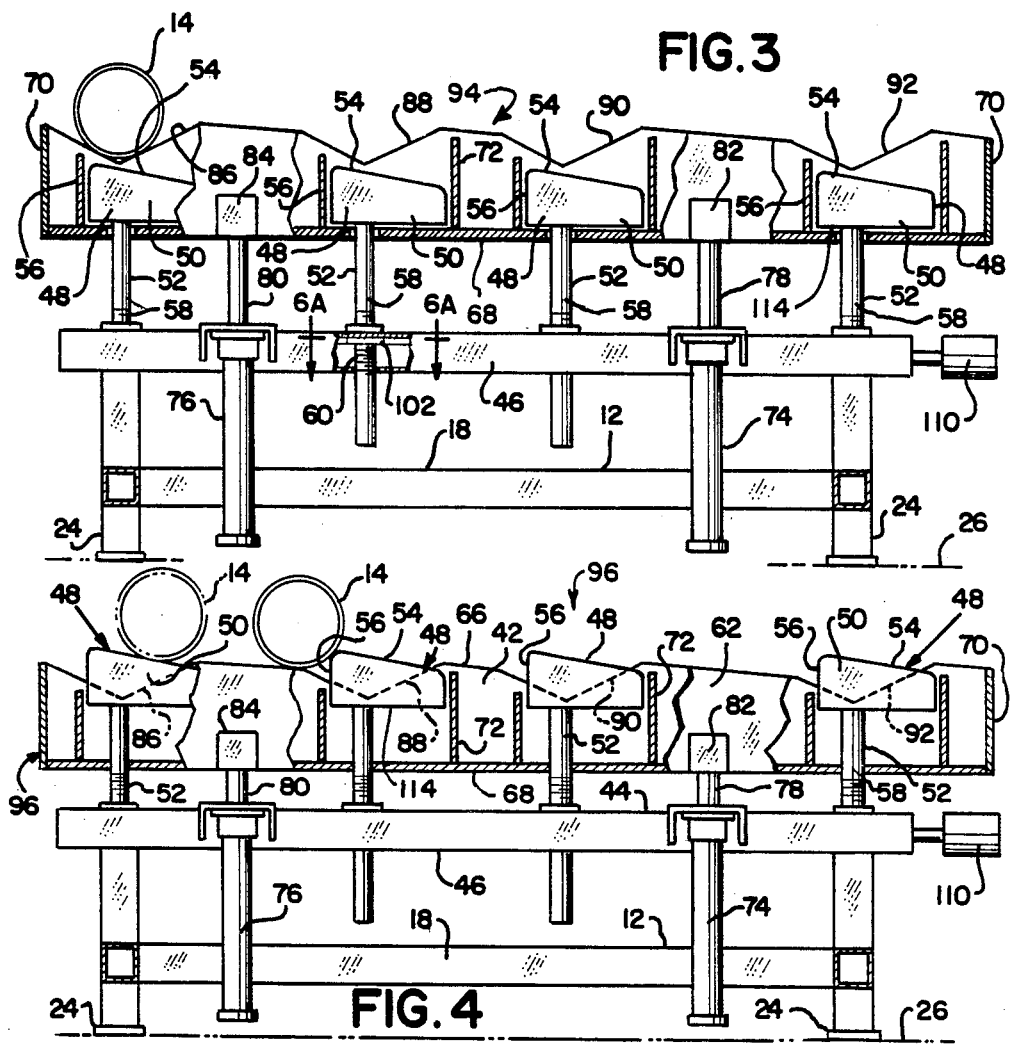
FIG. 3
FIG. 4
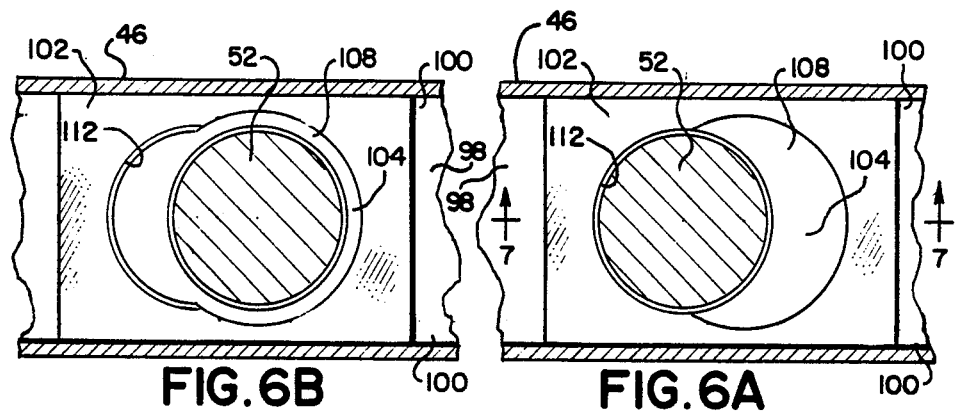
FIG. 6B    FIG. 6A

PIPE TRANSPORTING MACHINE

FIELD OF INVENTION

The present invention relates generally to the field of transporting individual lengths of plastic pipe, and more particularly, is directed to a machine suitable for transversely moving individual lengths of plastic pipe for introduction into a belling system for application of a hub or bell end thereon.

BACKGROUND OF THE INVENTION

The present invention relates generally to the field of plastic pipe working machines, and more particularly, is directed to a pipe transporting device that is capable of transversely moving previously cut lengths of plastic pipe through preheating and bell forming stations for delivery to a finished pipe exit station.

Pipe belling machines of the type contemplated by the present invention have in the past included a frame having a plurality of chain conveyors which function transversely of the frame in unison to carry previously cut lengths of plastic pipe across the frame toward a belling station.

The usual chain conveying systems have included spaced pluralities of pins which function to push successive lengths of pipe upwardly along a slightly inclined path toward the belling station. Usually, a plurality of transversely positioned moving belts have been associated with the chain conveyors, which belts are arranged for continuous operation during all periods when the machine is in use. The previously cut lengths of plastic pipe rest upon the moving belts as the pipes are indexed across the machine by the conveyors so that the belts function to rotate each length of pipe continuously as the pipe is conveyed transversely across the machine by the chain conveyors. The spaced pins on the chain conveyors have been provided to maintain the pipes in previously preset locations transversely along the frame as the pipes are being processed through the machine.

Most of the prior art belling machines of the type contemplated by the present invention comprise a plurality of discrete stations, the first one of which can be considered the receiving station to receive individual lengths of pipe from an extruder after the individual pipe is cut to a desired length by a known type of cutting saw. Transversely adjacent to the receiving station is positioned one or more heating stations wherein one pipe end can be indexed in a rotational manner beneath one or more infra-red heaters in a usual manner to permit one end of the pipe to be continuously heated as the pipe is transversely indexed across the machine by the chain conveyors and as the pipe is rotated by a moving belt.

A final station, the belling station, is positioned transversely adjacent to the heater or heaters wherein a power operated mandril is employed to press a predetermined shape onto the previously heated end of each length of pipe. The shape impressed upon the heated end of the pipe can be of any desired configuration in accordance with the design of the pipe by controlling the configuration and design of the shaping mandril and jaws. Suitable controls in the nature of limit switches, micro-switches and the like have been provided to control automatically the function of the chain conveyors, the power mandril and the time and operation of the belling cycle.

Pipe transporting machines of the general type contemplated by the present invention have usually been employed in conjunction with a belling mandril wherein the mandril can be designed to not only provide a bell or hub shaped end, but also, to simultaneously impress a radially inwardly facing groove in the hub end for receiving therein a sealing gasket to facilitate the easy assembly of a leak-proof joint when adjacent lengths of pipe are associated in end-to-end juxtaposition in well known manner.

SUMMARY OF THE INVENTION

The present invention relates generally to the field of pipe transporting machines, and more particularly, is directed to a novel transporting machine that is capable of transversely moving individual lengths of pipe in an automatic manner transversely across the machine from a receiving station to a belling station.

The pipe transporting machine of the present invention provides a greatly simplified transverse pipe transporting arrangement wherein all of the previously required chain conveyors and moving belts can be eliminated. Further, a great percentage of the framing members and operating components that had been required by prior art designs can now be removed and eliminated from the present pipe transmitting machine without loss of control and without sacrificing any efficiency.

The pipe transporting machine of the present invention includes a fixed frame having a fixed pipe transporting system at one end thereof and a second, movable pipe transporting system in movable, spaced relationship from the first system. By employing the combination of a fixed pipe transporting system and a single, movable pipe transporting system an extremely simple and rugged machine frame can be developed to thereby eliminate costly construction members and a considerable amount of time required for machine fabrication purposes.

The fixed and movable pipe transporting systems are similar in design and in function and include generally a transverse head, including a transversely declined top surface in which kickers are simultaneously movable between an upper, pipe moving position to a lower pipe stopping position. A plurality of individual kickers are provided in transversely spaced relationship to the fixed and movable heads to facilitate transverse pipe movement in precise, transversely spaced segments. The kickers are simultaneously vertically adjustable between their pipe stopping positions and pipe transporting positions by employing a novel kicker locking and unlocking system.

The kicker locking and unlocking systems each comprise a horizontally sliding locking bar, which bars include a plurality of spaced, noncircular openings through which the kicker height adjusting rods are vertically movable. In the preferred embodiment, the kicker height adjustment rods are provided with a plurality of non-helical, circular threads for height-adjustment locking purposes. Helical threads may also be employed for this purpose. The openings in the locking bars each include an enlarged, generally circular opening of size to permit vertical sliding of the kicker height adjustment rods therethrough without restraint. Communicating with each of the circular openings are small, circular openings having non-helically threaded sidewalls with circular threads of size and configuration to engage the circular threads of the kicker height and adjustment rods.

Accordingly, by pushing the locking system locking bars in one direction, the kicker height adjustment rods will each be positioned within a larger circular opening to thereby permit the height of the kickers to be vertically adjusted without restraint. When the lock bars of the kicker lock system are transversely moved to engage the threads of the smaller, threaded opening with the threads of the kicker height adjustment rods, then the kickers will all be simultaneously locked in a vertically oriented position whereby there can be no vertical movement of the kickers relative to the frame. In this manner, the pipe transporting machine can be easily set up and securely locked in any desired height adjusted position to accommodate the particular diameter of the pipe being introduced to the machine for belling purposes.

It is therefore an object of the present invention to provide an improved pipe transporting machine of the type set forth.

It is another object of the present invention to provide a novel pipe transporting machine which includes easily adjusted set-up means to readily accommodate pipe lengths of the various diameters.

It is another object of the present invention to provide a novel pipe transporting machine which includes a vertically movable frame and a plurality of vertically adjustable, and easily lockable kickers which are normally fixed in position when the frame is being vertically reciprocated for transverse pipe movement purposes across the machine.

It is another object of the present invention to provide a novel pipe transporting machine comprising generally a stationary frame, transverse pipe indexing means which are vertically reciprocal within the frame and stationary, adjustable height kickers associated with the indexing means to incrementally urge discrete lengths of pipe across the machine for belling purposes.

It is another object of the present invention to provide a novel pipe transporting machine comprising a frame, a pair of spaced indexing means arranged for vertical reciprocation relative to the frame, a plurality of stationary kickers spaced along the indexing means and height adjustment means to simultaneously adjust the height of the kickers to a predetermined elevated position, the height adjustment means including means to lock the kickers in the predetermined elevated position.

It is another object of the present invention to provide a novel pipe transporting machine that is simple in design, rugged in construction and virtually trouble-free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 3 is a cross-sectional view taken along line 3—3 on FIG. 1, looking in the direction of the arrows, partially broken away to expose interior construction details, and with the indexing means in an elevated position.

FIG. 4 is a cross-sectional view similar to FIG. 3 showing the indexing means in the lower position for pipe indexing, and partially broken away to expose interior construction details.

FIG. 5 is a partial, enlarged, perspective, exploded view showing the kicker height adjustment mechanism.

FIG. 6A is an enlarged, partial, cross-sectional view taken along line 6A—6A on FIG. 3, looking in the direction of the arrows and showing the lock bar and kicker rod in locked condition.

FIG. 6B is an enlarged, partial, cross-sectional view similar to FIG. 6A, showing the lock bar and kicker adjusting rod in unlocked condition.

FIG. 7 is a partial cross-sectional view taken along line 7—7 on FIG. 6A, looking in the direction of the arrows.

DESCRIPTION OF THE PREFERRED EMBODIMENT OF THE INVENTION

Figure 1:
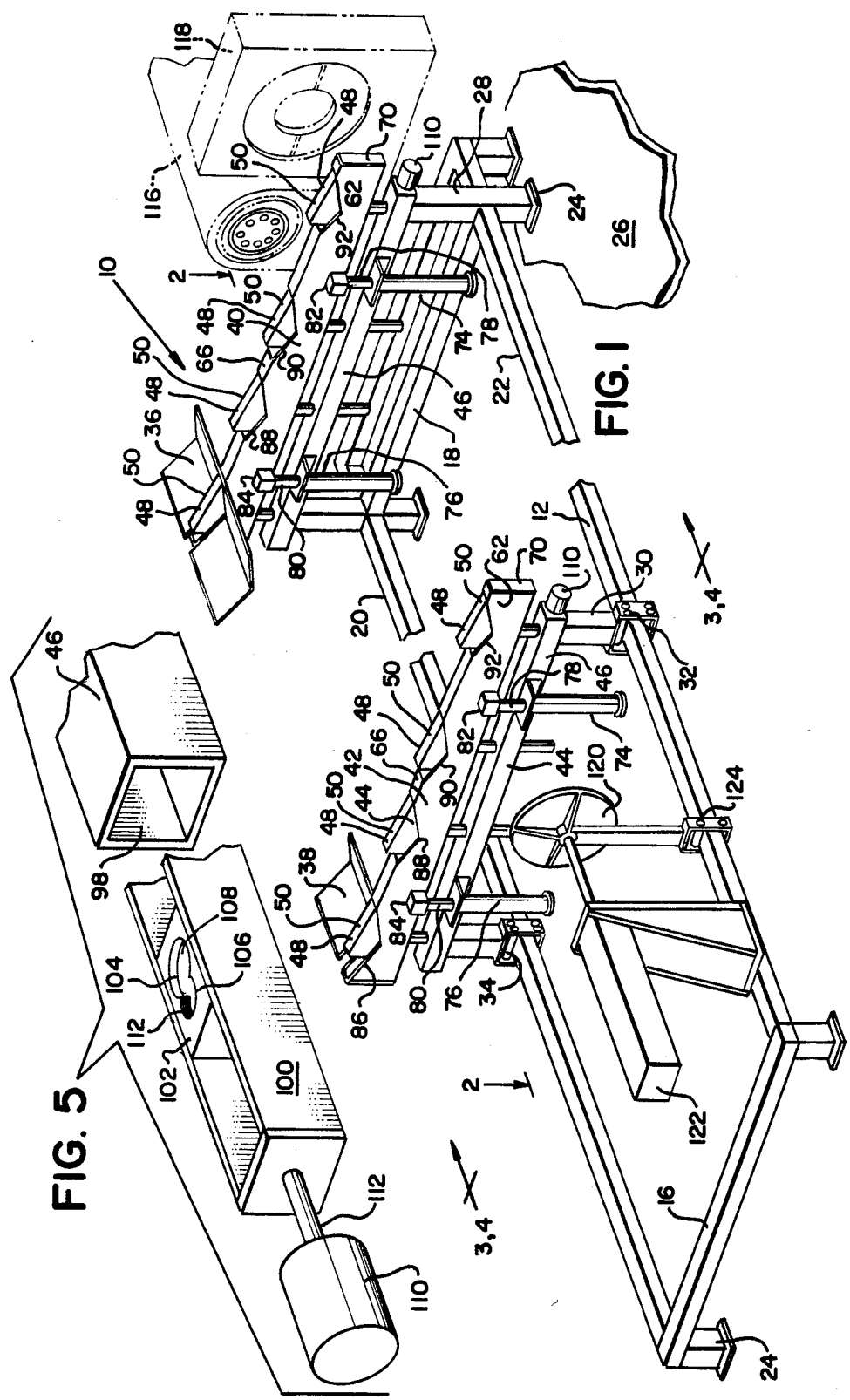
FIG. 1 is a perspective view of the pipe transporting machine of the present invention showing the indexing means in a lower, pipe stopping position and with accessory equipment such as a heater and a pipe belling station in phantom lines.
Figure 2:
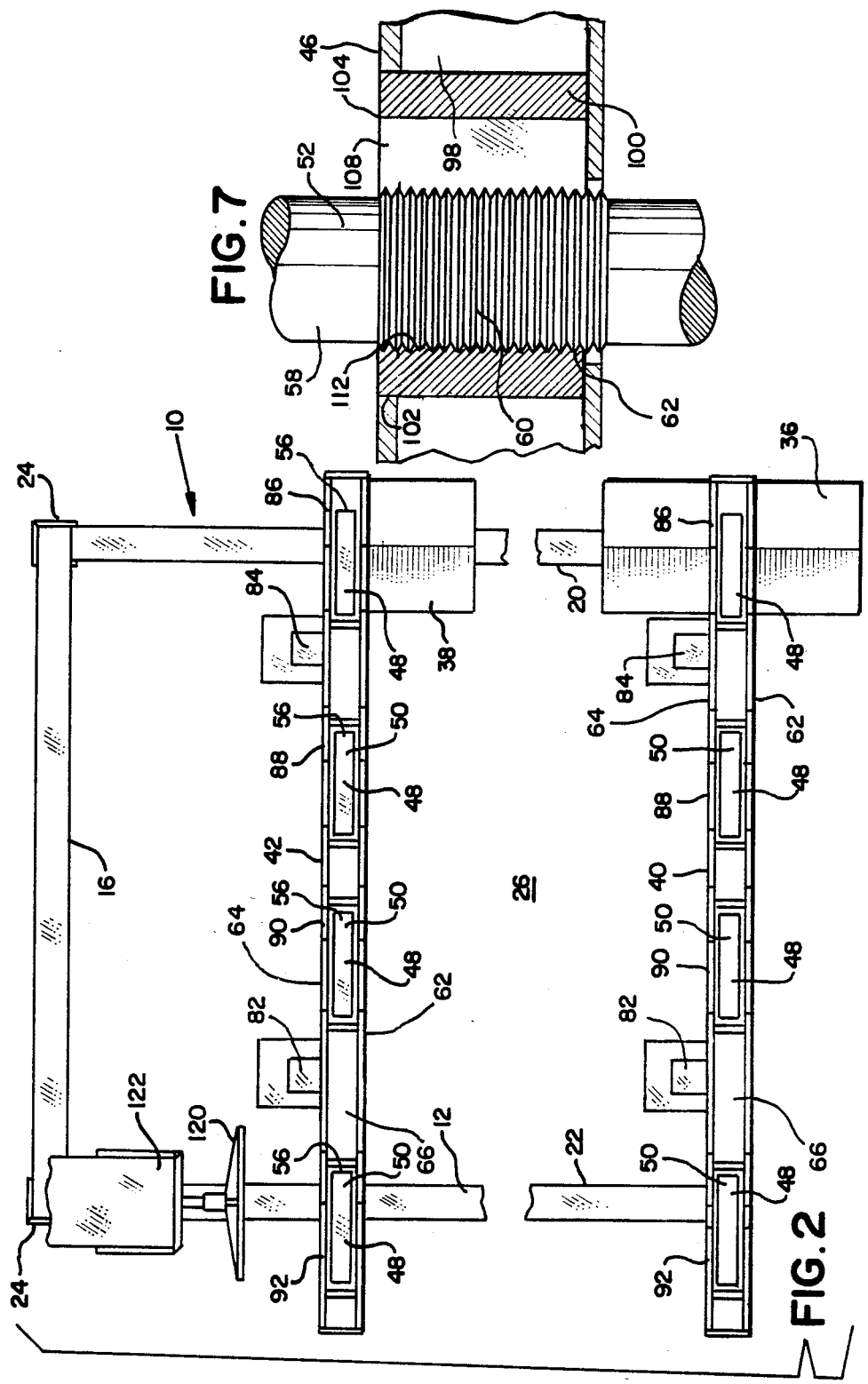
FIG. 2 is a top plan view looking from line 2—2 on FIG. 1.

Although specific terms are used in the following description for the sake of clarity, these terms are intended to refer only to the particular structure of the invention selected for illustration in the drawings, and are not intended to define or limit the scope of the invention.

Referring now to the drawings, there is illustrated in FIG. 1 a pipe transporting machine generally designated 10 which comprises a stationary frame 12 of suitable strength and configuration to transport transversely a plurality of plastic pipes 14 (FIGS. 3 and 4) for pipe belling purposes. In the illustrated embodiment, the frame comprises at least a pair of transverse frame members 16, 18 and a pair of interconnecting longitudinal frame members 20, 22. Preferably, a plurality of sturdy feet 24 mount the frame 12 upon a horizontal surface, for example, a pipe belling factory floor 26.

A transverse, stationary bulkhead 28 is fixed in position at the inlet end of the machine at the inlet end of the longitudinal framing members 20, 22. Still referring to FIG. 1, it will be observed that a movable bulkhead 30 is longitudinally spaced from the stationary bulkhead 28 and is arranged for longitudinal movement along the rails 20, 22. In a preferred embodiment, the bulkhead legs are equipped with a plurality of rollers 32 to facilitate movement along the rails 20, 22 in known manner. For example, by pushing the bulkhead 30 toward the stationary bulkhead 28, the plurality of left and right rollers will roll upon the flat surfaces of the rails 20, 22 to facilitate longitudinal movement of the bulkhead. Similarly, by pushing the movable bulkhead 30 away from the stationary bulkhead 28, the entire bulkhead will roll upon the pluralities of right and left rollers 32, 34 to increase a longitudinal spacing between the respective bulkheads 28, 30.

Accordingly, it will be appreciated that only two bulkheads, a stationary bulkhead 28 and a movable bulkhead 30 will be required to accommodate pipes 14 of all usual lengths, for example, ten feet, fourteen feet and twenty feet. If the pipes being processed are of shorter length, the movable bulkhead 30 is pushed toward the stationary bulkhead 28 sufficiently to allow the bulkheads to support the lateral ends of the pipe for transverse indexing across the machine in a manner hereinafter set forth. Should it be determined to process pipes of larger lengths, then the movable bulkhead 30 can be pushed along the rails 20,22 away from the stationary bulkhead 28 sufficiently to accommodate longer lengths of pipe. Pipe inlet trays 36, 38 of generally elongated V-shaped configuration are respectively affixed to the indexing means 40,42 associated with each bulkhead 28, 30 to guide and support the ends of a length of plastic pipe 14 as each length is introduced into the machine 10.

Each bulkhead 28, 30 comprises a generally U-shaped frame 44 which includes a hollow interior and a bottom transverse web 46. A plurality of similar, transversely spaced kickers 48 are vertically adjustable and lockable within the frames 44 to accommodate plastic pipes 14 of varying diameters in the manner hereinafter more fully discussed in detail. Each kicker 48 comprises a head 50 which is securely affixed atop an adjusting rod 52. Each kicker head comprises a transversely downwardly inclined indexing surface 54 and a generally vertical stop surface 56, which surfaces 54, 56 are utilized alternately either to stop a pipe or to transversely index the pipe across the machine. The kicker adjusting rod 52 preferably includes an unthreaded section 58 and a threaded or locking section 60. The locking section 60 comprises a plurality of threads 61, which threads preferably are circular, but which may be helical in configuration for more positive kicker elevation locking purposes as hereinafter more fully explained. Suffice it to say that the kicker adjusting rods 52 are adapted for vertical reciprocation relative to the frames 44 to allow vertical adjustment of the elevated position of the kicker heads 50.

Left and right, similar indexing means 40,42 are similar in configuration and are arranged for simultaneous vertical reciprocation relative to respective pluralities of stationary kickers 48. Each indexing means 40, 42 comprises generally a hollow, elongated body defined by spaced sides 62, 64, partially enclosed tops 66 and generally closed bottoms 68. End plates 70 generally complete the end closures of the indexing means 40, 42. If desired, one more internal strengthening ribs 72 may be employed and positioned adjacent to the kicker heads 50.

As best seen in FIGS. 1, 3 and 4, the right and left indexing means 40, 42 are reciprocally carried within the frames 44 by respective front and rear cylinders 74, 76. Each cylinder 74, 76 comprises a piston rod 78, 80. The rods 78, 80 respectively terminate upwardly in a secure interconnection 82, 84 such as a threaded connection of known type, to secure the indexing means 40, 42 respectively to a pair of front and rear cylinders 74, 76 for simultaneous vertical reciprocation. Accordingly, when the pairs of cylinders 74, 76 are activated simultaneously in known manner, the piston rods 78, 80 will vertically extend to thereby cause the affixed indexing means 40, 42 to elevate. Similarly, deactivation of cylinders 74, 76 will cause the piston rods 78, 80 to retract, thereby lowering the indexing means 40, 42.

Still referring to FIG. 4, each indexing means is provided with a plurality of transversely spaced, generally V-shaped notches 86, 88, 90, 92 for receipt therein and temporary restraint of a length of plastic pipe 14. As illustrated, one kicker assembly is provided in association with each of the V-shaped notches 86, 88, 90, 92. The respective pipe inlet trays 36, 38 are positioned in association with the uppermost or first notches 86 as illustrated.

Still referring to FIGS. 1 and 4, it will be observed that each indexing means 40, 42 slopes generally from the rear to the front of the machine to facilitate transverse movement of the pipes 14 by rolling across the partially closed tops 66 from the rearwardmost grooves or notches 86 to the forwardmost grooves or notches 92. The plurality of kickers 48 are utilized to interrupt and to index transversely, rolling movement of the pipes 14 as they roll transversely along the upper surface 66 of the index means 40, 42.

In order to index pipes 14 across the pipe transporting machine 10, the indexing means 40, 42 are reciprocal between an upper position 94 as illustrated in FIG. 3 and a lower position 96 as illustrated in FIG. 4. The geometry of the system is such that when the cylinders 74, 76 are activated to extend their respective piston rods 78, 80, the indexing means 40, 42 will be elevated to their respective upper positions 94 as illustrated in FIG. 3. It will be noted in this position that the V-shaped notches or grooves 86, 88, 90, 92 will be entirely exposed to receive and seat thereon individual lengths of plastic pipe 14.

Upon function of the front and rear cylinders 74, 76 simultaneously, the indexing means 40, 42 will be urged to their lower positions 96 as illustrated in FIG. 4. In this lower position 96, the kicker heads 50 will extend upwardly through the respective notches 86, 88, 90, 92 and the inclined indexing surfaces 54 will engage each length of pipe as it resides in a notch 86, 88, 90, 92. It will be noted that the indexing surfaces 54 incline downwardly to the right as illustrated in FIG. 4 and accordingly, each length of pipe will roll downwardly by gravity as illustrated by the left pipe 14 shown in FIG. 4. The pipes will roll along the portions of the partially closed tops intermediate adjacent notches until the pipe contacts and stops against the stop surface 56 of the next forwardly and downwardly adjacent kicker head 50 as illustrated in the pipe shown on the right in FIG. 4. The respective lengths of pipe will remain stopped against a kicker stop surface 56 at all times when the indexing means 40, 42 are maintained in their lowermost positions 96.

Upon reactivation of the front and rear cylinders 74, 76, the piston rods 78, 80 will be extended upwardly to raise the indexing means 40, 42 to the upper position 94. See FIG. 3. In the upper position 94, the kicker heads 50 will be positioned below the bottoms of the notches 86, 88, 90, 92, thereby clearing the notches to allow the individual lengths of pipe to enter the notches by rolling across the transversely downwardly inclined top surfaces 66. When the pipes 14 are temporarily restrained within the notches 86, 88, 90, 92, other operations, such as rotating the pipes, heating the ends of the pipes, belling the ends of the pipe, etc., can be accomplished in an orderly and precisely controlled manner.

After the pipe treating operation is completed with the pipe contained in one of the notches, vertical reciprocation of the indexing means 40, 42 will function to index each length of pipe transversely across the machine 10 in repetitious manner as hereinbefore set forth. Accordingly, upon each vertical reciprocation of the indexing means 40, 42, each length of pipe in turn will be caused to index transversely forwardly across the machine from one V-shaped notch to the next adjacent positioned V-shaped notch until all of the operations to be performed on the pipe have been completed. When each pipe in turn is expelled from the front notch 92, it will be transported over inclined ramps (not shown) for subsequent removal from the machine end.

Referring now to FIGS. 5-7, the kicker elevation locking apparatus can now be described. As hereinabove set forth, each U-shaped frame 44 comprises a hollow interior 98 within which a lock bar 100 is transversely reciprocal between a locking position and an unlocked position. The lock bar 100 includes a plurality of spaced kicker rod lock blocks 102 whereby one lock block is provided for each kicker 48. Each lock block 102 comprises a shaped, vertical opening 104 having a threaded section 106 and a contiguous, communicating, enlarged, nonthreaded section 108. It is an important feature of this invention to form the threads in the threaded section 106 in cooperating configuration to the threads 61 of the locking section 60.

As best seen in FIG. 5, a cylinder 110 is secured to each U-shaped frame 44 and has its rod 112 secured to one end of each lock bar 100 for transverse reciprocation thereof within the hollow interiors 98. It is important that the cylinders 110 be wired or otherwise controlled to function simultaneously to simultaneously transversely move the attached lock bars 100. Accordingly, when the lock bars 100 are pulled to their forwardmost positions as illustrated in FIG. 6A, the threads 112 of the threaded section 106 of the opening 104 will be drawn into engagement with the threads 61 of the adjusting rod locking sections 60. The cylinders 110 function in unison to simultaneously either engage or disengage the plurality of kickers 48.

In order to adjust the height of the kickers simultaneously, the cylinders 110 are activated to push the lock bars 100 to the kicker release position illustrated in FIG. 6B. In this position, the respective kicker adjusting rods 52 will be positioned within the enlarged sections 108 of the lock insert openings 104. With the kicker adjusting rods 52 so positioned, the kickers will be allowed to drop by gravity until the respective bottoms 114 of the kicker heads 50 bottom against the closed bottoms 68 of the indexing means 40, 42. Accordingly, the indexing means bottoms 68 will limit the downward travel of the kickers 48 relative to the U-shaped frames 44. Then, upon activation of the front and rear cylinders 74, 76, the respective piston rods 78, 80 will push the indexing means 40, 42 simultaneously upwardly.

The interengagement of the respective kicker bottoms 114 with the indexing means bottoms 68 will cause the indexing means 40, 42 to simultaneously elevate all of the kicker assemblies 48. When the kicker heads 50 are elevated to the desired position, the controls (not shown) functioning the lock bar cylinders 110 can be activated to move simultaneously the lock bars 100 from the release position illustrated in FIG. 6B to the locked position illustrated in FIG. 7. As hereinabove set forth, this will cause the lock block threads 112 to engage and interact with the threads 61 of the locking sections 60 to thereby prevent absolutely any further vertical movement of the kickers 48 relative to the frames 44. With the kicker assemblies 48 thus locked in position, further upward vertical movement of the indexing means 40, 42 will be prevented by the interaction of the respective kicker head bottoms 114 against the bottoms 68 of the indexing means 40, 42. The absolute stop surfaces provided by the interaction of the respective bottoms 114, 68 will over-ride the forces generated by the plurality of cylinders 74, 76 and thereby precisely define the upper limit of travel of the indexing means 40, 42 for controlling precisely the elevation of the pipes 14 as they are indexed across the pipe transporting machine 10.

If desired, the portions of the indexing means top surfaces 66 which are exposed between adjacent kicker assemblies 48 may be provided with angle adjustment means, for example, by providing pivoted bars to decrease the angularity from the rear of the machine toward the front whereby the momentum generated by large diameter pipes can be reduced to a controllable level to permit the respective kicker head stop surfaces 56 to engage and to stop the rolling movement of the pipes 14 as they are indexed across the machine.

In the illustrated embodiment, the pipe transporting machine is shown in conjunction with a pipe belling machine of the type including a heater 116 and a belling head 118. If desired, rubber rollers (not shown) may be provided in well known manner adjacent to the heater 116 to rotate the pipes 14 as they are traversed across the heater. Such rollers can be rotated in known manner by employing a motorized drive (not illustrated) in any usual, known manner.

In the illustrated embodiment, a pusher 120 of known design is secured upon the forward longitudinal rail or frame member 22 and includes a plurality of rollers 124 in a manner to permit longitudinal movement of the pusher 120 along the rail 22. The pusher includes a cylinder 122 which can be functioned in known manner to longitudinally push one heated end of a pipe 14 into the belling head 118 in well known manner wherein a shaped bell can be impressed upon the previously heated pipe end.

In operation, the plurality of cylinders 74, 76 are activated in unison in known manner to simultaneously vertically reciprocate the indexing means 40, 42. Accordingly, when the indexing means 40, 42 are reciprocated to the lowermost positions illustrated in FIGS. 1 and 4, the kicker head stop surfaces 56 will be exposed above the top surfaces 66 of the indexing means to thereby engage and stop a length of pipe as it is indexed across the machine. The continuous simultaneous function of the cylinders 74, 76 causes reciprocation of the indexing means to the raised position illustrated in FIG. 3 wherein the pipes will roll into the next forwardly adjacent V-shaped notch 86, 88, 90, 92 wherein the notches will center and position each length of pipe for the processing operations carried on at that particular transverse station. The repeated cyclical operation of the cylinders 74, 76 will cause downward reciprocation of the indexing means 40, 42 to carry the pipes 14 downwardly, the downwardly inclined indexing surfaces 54 of the stationary kicker heads 50 will then engage each length of pipe, forwardly and rearwardly, to cause the lengths of pipe to roll transversely in spaced increments toward the belling station 118. Upon each downward vertical reciprocation of the indexing means, each pipe will advance transversely to the next adjacent kicker head wherein it will be stopped. See FIG. 4. Each next upward reciprocation of the indexing means will elevate the notches 86, 88, 90, 92 above the kicker heads to thereby allow the pipes to roll by gravity into an adjacent notch. See FIG. 3.

Although the invention has been described with reference to the particular embodiments herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

What is claimed is:

1. A pipe transporting machine comprising a frame;

first and second indexing means mounted on the frame in spaced relationship to transversely move discrete lengths of pipe across the frame, the first and second indexing means being provided with a plurality of transversely juxtaposed notches;

means to simultaneously vertically reciprocate the first and second indexing means relative to the frame to simultaneously reciprocally raise and lower each indexing means in unison between an upper position and a lower position;

a plurality of similar kicker means spaced along the first and second indexing means to control the transverse movement of the pipe across the frame, the plurality of kicker means being stationary when the first and second indexing means are reciprocated, the kicker means being adapted for vertical adjustment relative to the frame, said first and second indexing means being configured to permit each kicker means to project upwardly through a respective indexing means and one of the said notches when the first and second indexing means are reciprocated to their said lower positions; and kicker height adjustment means operably secured to the frame to simultaneously adjust the height of a plurality of kicker means;

whereby the lengths of pipe will be individually indexed across the machine in spaced increments upon each vertical reciprocation of the first and second indexing means.

2. The pipe transporting machine of claim 1 wherein the plurality of notches are configured to receive and temporarily retain a pipe therein.

3. The pipe transporting machine of claim 2 wherein the means to vertically reciprocate the indexing means comprises a plurality of cylinders.

4. The pipe transporting machine of claim 1 wherein the notches define top portions of the indexing means between the notches, the said top portions being declined in a first direction to roll the lengths of pipe in a first direction.

5. The pipe transporting machine of claim 4 wherein the kicker head comprises an indexing surface and a stop surface, the said surfaces defining an angular intersection therebetween.

6. The pipe transporting machine of claim 5 wherein the angular intersection defined between the said surfaces is less than ninety degrees.

7. The pipe transporting machine of claim 5 wherein the stop surface extends above the top portions of the indexing means to stop transverse movement of a length of pipe when the indexing means are reciprocated to their said lower positions.

8. The pipe transporting machine of claim 7 wherein the stop surface extends below the top portions of the indexing means to permit transverse movement of a length of pipe when the indexing means are reciprocated to their said upper positions.

9. The pipe transporting machine of claim 7 wherein the indexing surfaces of the kicker heads are angularly, transversely declined and wherein the said indexing surfaces initiate downward transverse movement of the pipe when the indexing means are reciprocated to the said lower positions.

10. The pipe transporting machine of claim 1 wherein the first indexing means is non-movably fixed upon the frame and wherein the second indexing means comprises means to move the second indexing means longitudinally along the frame to vary the spacing between the first and second indexing means.

11. A pipe transporting machine comprising a frame;

first and second indexing means mounted on the frame in spaced relationship to transversely move discrete lengths of pipe across the frame;

the first and second indexing means each comprising a plurality of transversely spaced notches, the notches being configured to receive and temporarily retain a pipe therein, the notches defining top portions of the indexing means between the notches, the said top portions being declined in a first direction to roll the lengths of pipe in a first direction;

means to vertically reciprocate the first and second indexing means relative to the frame to alternately raise and lower each indexing means between an upper position and a lower position;

a plurality of similar kicker means spaced along the first and second indexing means to control the transverse movement of the pipe across the frame, the kicker means being positioned in vertical alignment with at least some of the notches, the kicker means being adapted for vertical adjustment relative to the frame, the kicker means comprising an adjusting rod and a head affixed to the adjusting rod; and kicker height adjustment means operably secured to the frame to simultaneously adjust the height of a plurality of kicker means, the kicker height adjustment means comprising a lock bar mounted on the frame in alignment with a plurality of kicker means, the lock bar being provided with openings for each adjusting rod and means to move the lock bar between a first adjusting rod locked position and a second adjusting rod unlocked position;

whereby the lengths of pipe will be individually indexed across the machine in spaced increments upon each vertical reciprocation of the first and second indexing means.

12. The pipe transporting machine of claim 11 wherein the openings are defined by sidewalls which are non-circular.

13. The pipe transporting machine of claim 12 wherein a portion of the non-circular sidewalls is threaded.

14. The pipe transporting machine of claim 13 wherein the threads of the threaded portion are non-helical.

15. The pipe transporting machine of claim 13 wherein a portion of the kicker means adjusting bar is threaded, the threaded portion of the adjusting bar being engaged with a threaded portion of the opening sidewalls when the lock bar is moved to the first position, whereby the height of a kicker means head can be adjusted when the lock bar is moved to the second position and the height of the kicker means head is fixed when the lock bar is moved to the first position.

* * * * *